UNITED STATES PATENT OFFICE.

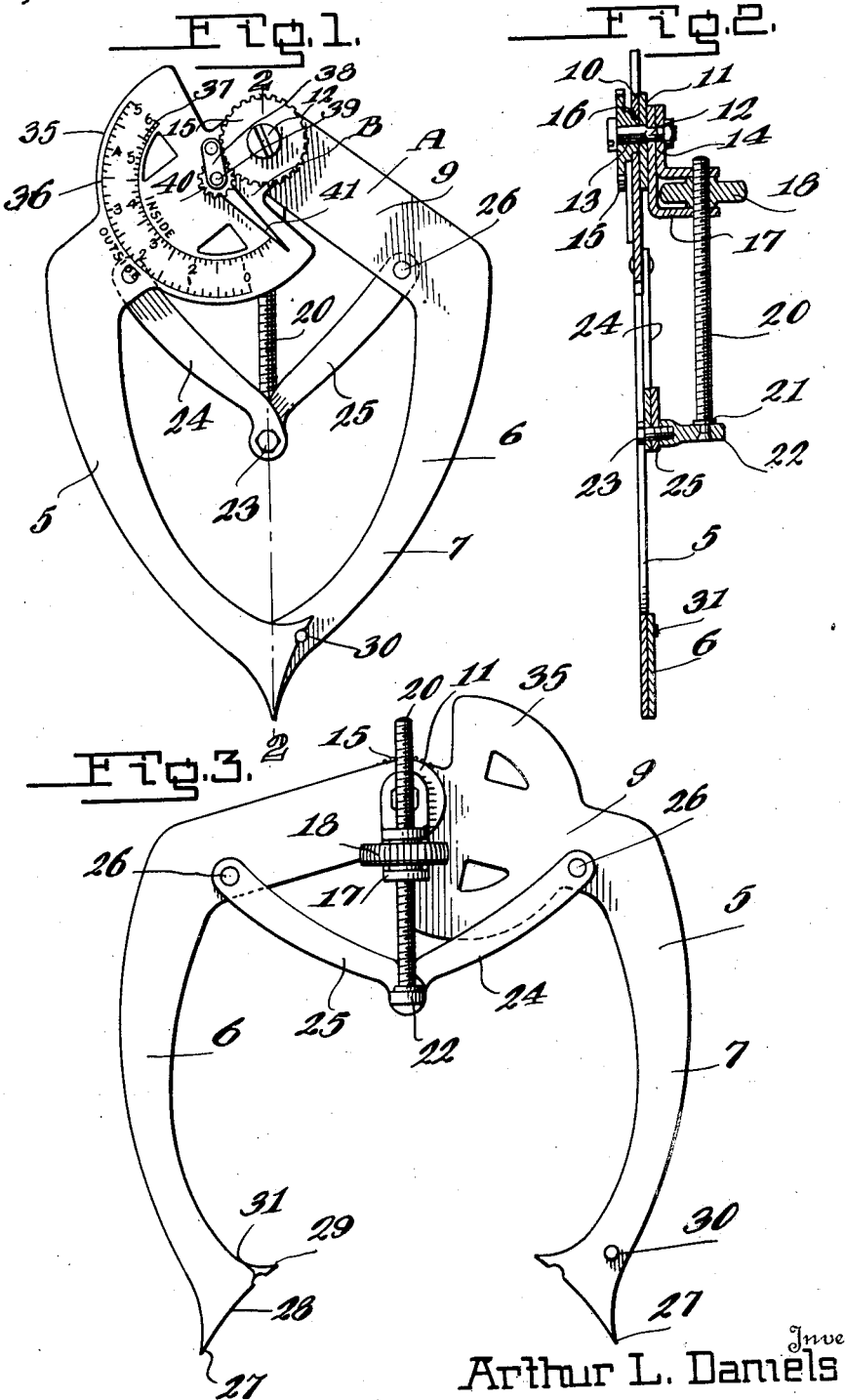

ARTHUR L. DANIELS, OF BURLINGTON, VERMONT.

MEASURING INSTRUMENT.

1,382,628.  Specification of Letters Patent.  Patented June 28, 1921.

Application filed October 19, 1920. Serial No. 417,992.

*To all whom it may concern:*

Be it known that I, ARTHUR L. DANIELS, a citizen of the United States, residing at Burlington, in the county of Chittenden and State of Vermont, have invented certain new and useful Improvements in Measuring Instruments, of which the following is a specification.

This invention relates to measuring instruments, and the primary object of the invention is to provide a machinist's or carpenter's calipers of the combination type which is adapted for either inside or outside work, and which is so constructed that the exact size of the work being measured can be instantly ascertained without the use of the usual rule.

Another object of the invention is to provide an improved caliper for measuring inside and outside work having a dial and pointer operatively connected thereto for indicating the exact size of an article being measured to the fraction of an inch, thereby eliminating the inconveniences usually experienced in the finding of the exact measurements of an article in the use of calipers.

A further object of the invention is to provide an improved means for adjusting the legs of the caliper by an adjusting screw, so that the legs can be finely adjusted to find the exact measurements of an article to a thousandth of an inch.

A still further object of the invention is to provide an improved inside and outside caliper of the above character, which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is a front elevation of the improved caliper.

Fig. 2 is a longitudinal section through the same taken on the line 2—2 of Fig. 1.

Fig. 3 is a rear elevation of the improved caliper showing the legs in their spread or operative position.

Referring to the drawings in detail, wherein similar reference characters designate corresponding parts throughout the several views, the letter A indicates the improved measuring instrument, which includes the coöperating legs 5 and 6. These legs 5 and 6 are constructed substantially the same and include the arcuate curved body portions 7 and the inwardly extending angled portions 9. The inner terminals of the angled portions 9 of the legs 5 and 6 are provided respectively with hubs 10 and 11, which are operatively connected together by means of a shaft or bolt 12 which will be hereinafter more specifically described.

I do not wish to limit myself to the exact construction of connecting the legs 5 and 6 together nor the exact construction of the indicator B which will be hereinafter more fully described, and the bolt 12 and the coöperating parts have merely been shown as one form of connecting the legs and indicating mechanism.

The bolt 12, as shown, is provided with a polygonal shaped body portion 13, and a cylindrical terminal 14. The polygonal body portion 13 of the bolt 12 has rigidly mounted thereon for rotation therewith a relatively large gear wheel 15, and receives the hub 11 of the leg 6. Thus it can be seen that upon movement of the leg 6, the relatively large gear 15 will be turned therewith. The gear 15 is provided with a cylindrical bearing extension 16 on which is rotatably mounted the hub 10 of the leg 5. Thus it can be seen that the leg 5 is mounted for independent movement of the gear 15 and the leg 6. The gear 15 forms a part of the indicating mechanism B which will be hereinafter more fully described. The cylindrical portion 14 of the bolt 12 supports a pair of depending centrally disposed brackets 17 which have confined therebetween a thumb nut 18 which is threaded on a screw 20. The lower end of the screw 20, is secured as at 21 to a rearwardly extending bracket 22 which is carried by the pivot pin 23 which is utilized for pivotally connecting the inner lower ends of the adjusting arms 24 and 25 together. The upper terminals of the adjusting arms 24 and 25 diverge outwardly from each other as clearly shown in Fig. 1 of the drawings, and are connected by means of pivot pins 26 to the angle portions 9 of the legs 5 and 6 respectively.

Thus it can be seen that upon rotation of the thumb nut 18, the bracket 22 will be raised or lowered, thus moving the adjusting arms 24 and 25 causing the legs 5 and 6 to be adjusted toward or away from each other according to the direction of rotation of the thumb nut 18.

The lower free terminals of the measuring legs 5 and 6 are provided with points 27, which are utilized for measuring inside work. As shown the legs 5 and 6 terminate in flat angled faces 28, which are provided at their outer and inner ends with points, as clearly shown in Figs. 1 and 3 of the drawings. As shown the points 27 are formed on the outer ends of the faces 28 and points 29 are formed on the inner ends of the faces 28. These points 29 are utilized for measuring outside work. In order to prevent the collapsing of the legs 5 and 6 beyond a predetermined point, stop lugs 30 are provided, and the faces 28 are provided with recesses 31 for engaging the stop lugs. Thus the caliper is prevented from collapsing beyond a certain point which is shown in Fig. 1 of the drawings.

The indicating or measuring device B includes a substantially semi-circular dial plate 35, which is formed integral with the leg 5 adjacent to its hub 10. This dial plate 35 is provided with graduations 36 and 37 which are utilized for inside and outside measurements. The leg 5 has secured thereto a bracket 38 which supports a pivot pin 39 on which is rotatably mounted a relatively small gear 40, which meshes with the relatively large spur gear 15. The relatively small gear 40 carries a pointer 41, which is adapted to coöperate with the graduations 36 and 37 of the semi-circular dial plate 35.

In use of the improved inside and outside caliper, the thumb nut 18 is adjusted on the screw 20 for moving either the points 27 or 29 into engagement with the work according to whether the same is to be measured internally or externally. When the points have been adjusted into engagement with the work by the thumb nut 18, it is merely necessary to glance at the dial plate 35 and the distance between the two points to a fraction of an inch can be at once ascertained.

From the foregoing description, it can be seen that an exceptionally simple and durable caliper has been provided in which the exact distance between its points can be readily and easily determined.

Changes in details may be made without departing from the spirit or scope of this invention; but,

I claim:

1. An inside and outside caliper comprising a pair of legs pivotally connected together having measuring points formed thereon, a supporting bracket carried by the pivot of said legs, an adjusting screw slidably carried by the bracket, a pair of adjusting arms pivotally secured to the legs, means pivotally connecting the ends of the legs together, means pivotally connecting the lower end of the adjusting screw to the meeting terminals of the adjusting arms, and a thumb nut fitted on said screw for non-sliding movement in relation to the legs.

2. An inside and outside caliper comprising a pair of legs, means pivotally connecting the legs together at one end, a pair of brackets carried by said means, said legs having measuring points formed on the free ends thereof, inwardly extending adjusting arms pivotally secured to the legs, a pivot pin connecting the inner ends of the adjusting arms together, a bracket carried by said pivot pin, an adjusting screw secured to said bracket and slidably extending through the first mentioned brackets, a thumb nut arranged between said first mentioned brackets and threaded on said screw.

3. An inside and outside caliper comprising a pair of legs, a pivot connecting the legs together at one end, said legs having measuring points formed on the free ends thereof, a dial plate rigidly secured to one of the legs, a gear operated by the other leg for movement therewith, a swinging pointer carried by the first mentioned leg for movement over the dial plate, and a gear carried by said pointer and meshing with the first mentioned gear.

4. An inside and outside caliper comprising a pair of legs, a pivot connecting the legs together, means for securing one of the legs to the pivot pin for movement therewith, a relatively large gear secured to said pivot for movement therewith, the other leg being mounted for rotary movement independent of said pivot, a graduated dial plate formed on the last mentioned leg, a pointer arranged for swinging movement over the dial plate, a relatively small gear wheel secured to said pointer and meshing with the first mentioned gear, and a screw adjusting means for opening and closing said legs.

5. An inside and outside caliper comprising a pair of legs, a pivot connecting the legs together, means for securing one of the legs to the pivot pin for movement therewith, a relatively large gear secured to said pivot for movement therewith, the other leg being mounted for rotary movement independent of said pivot, a graduated dial plate formed on the last mentioned leg, a pointer arranged for swinging movement over the dial plate, a relatively small gear wheel secured to said pointer and meshing with the first mentioned gear, a screw adjusting means for opening and closing said legs, and means for limiting the closing movement of said legs.

6. An inside and outside caliper comprising a pair of legs having hubs formed on the outer terminals thereof and also having inside and outside measuring points formed on their opposite terminals, a pivot extending through said hubs, means rigidly securing one of the hubs to the pivot for movement therewith, the other hub being mounted for independent movement on the pivot, a gear wheel secured to the pivot for movement therewith, a dial plate rigidly secured to the leg arranged for movement independent of the pivot, a pointer carried by said last mentioned leg for movement over said dial, a relatively small gear secured to said pointer and meshing with the first mentioned gear, depending brackets secured to the pivot, inwardly extending adjusting arms pivotally secured to the legs, a pivot pin securing the inner ends of the adjusting arms together, a bracket secured to said pivot pin, an adjusting screw carried by said bracket and arranged to slidably extend through said first mentioned bracket, and an adjusting nut threaded on said screw and arranged between said first mentioned brackets.

ARTHUR L. DANIELS.